C. C. LIPPEN.
GRASS TRIMMER.
APPLICATION FILED SEPT. 22, 1914.
1,170,292.
Patented Feb. 1, 1916.
2 SHEETS—SHEET 1.
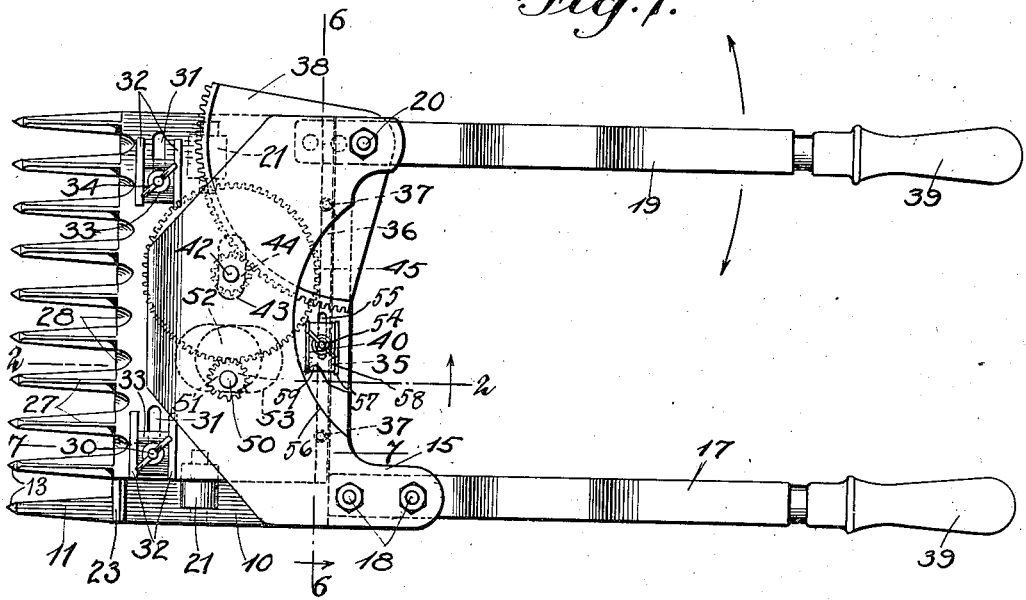
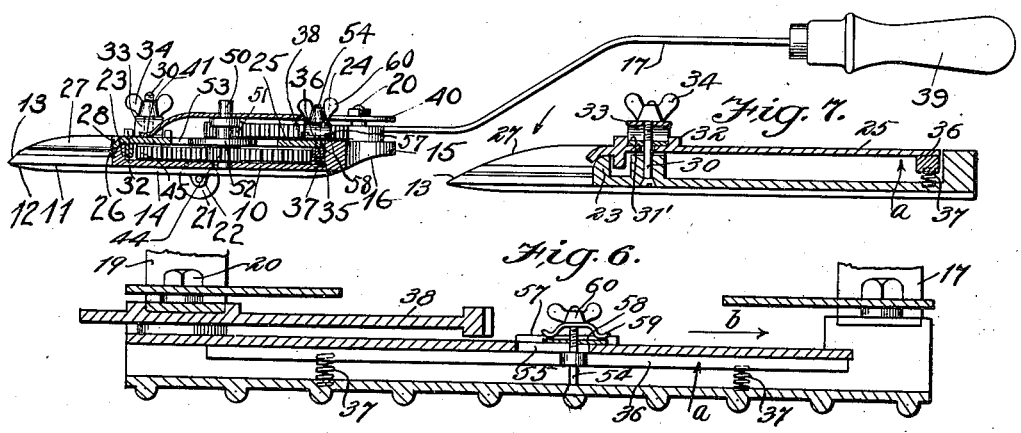
WITNESSES
Geo. W. Naylor
J. C. Burch
INVENTOR
Cornelius C. Lippen
BY Munn & Co
ATTORNEYS

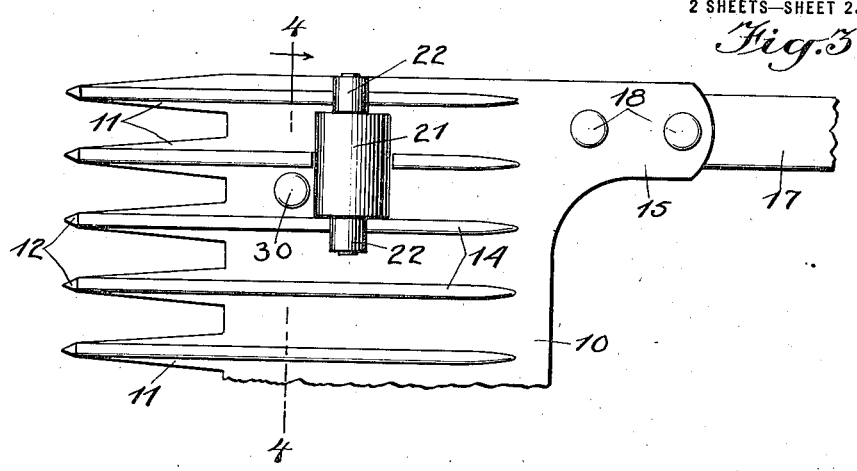
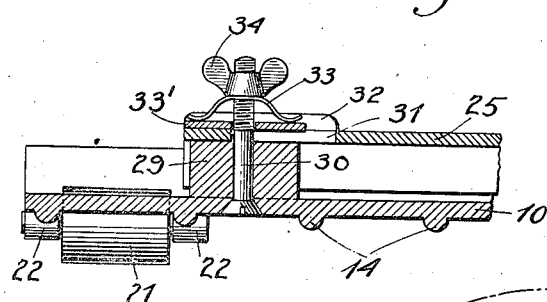
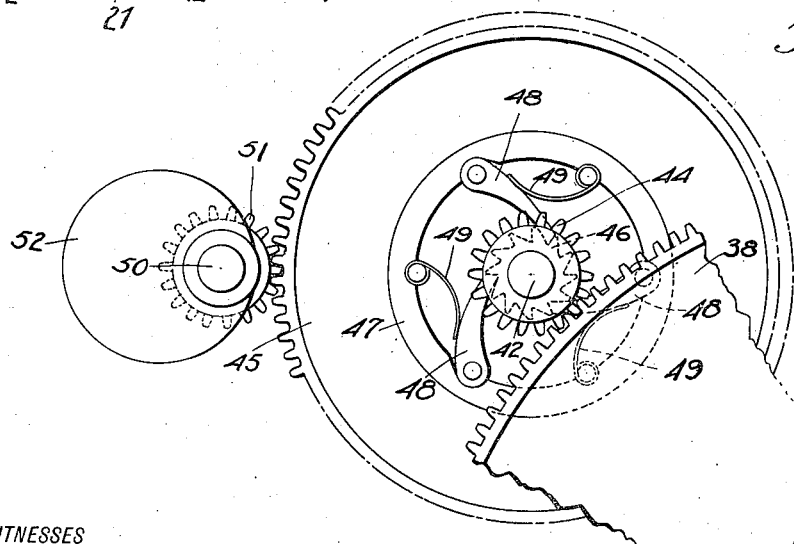

UNITED STATES PATENT OFFICE.

CORNELIUS CASSIDY LIPPEN, OF PHILADELPHIA, PENNSYLVANIA.

GRASS-TRIMMER.

1,170,292.  Specification of Letters Patent.  Patented Feb. 1, 1916.

Application filed September 22, 1914. Serial No. 862,889.

*To all whom it may concern:*

Be it known that I, CORNELIUS C. LIPPEN, a citizen of the United States, and a resident of Philadelphia, Roxborough, in the county of Philadelphia and State of Pennsylvania, have invented a new and Improved Grass-Trimmer, of which the following is a full, clear, and exact description.

My invention has special reference to an improved grass trimmer.

The essential object of the invention is comprehended in the provision of a grass or hedge trimmer which may be employed in compact spaces incapable of accommodating a lawn mower or other wheeled grass cutting implement or mowing machine, as well as to provide for the facilitation of the cutting of grass, hedges or the like in such places where the usual shears are used by avoiding the tedious and tiresome operation incident to the use of the latter and also permitting the running of the device along a straight or rectilinear line of grass or hedge to be trimmed so that a true cut can be made.

A still further object of the invention is comprehended in the provision of a double acting grass trimmer having two plates movable one with respect to the other and provided with co-acting blades such that the cutting edges of the blades of the movable plate operate between each pair of stationary blades at a high rate of reciprocation to secure a maximum cutting efficiency, while improved means are provided for reciprocating the movable plate and additional means provided for positively holding the blades in contact as well as to cause the latter to catch under the grass should the same be lying over or trodden down.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views and in which—

Figure 1 is a plan view of a grass trimmer constructed in accordance with my invention; Fig. 2 is a sectional view taken on the line 2—2 of Fig. 1; Fig. 3 is an enlarged fragmentary bottom view of the trimmer; Fig. 4 is a cross sectional view taken on the line 4—4 of Fig. 3; Fig. 5 is a detail plan view partly diagrammatic, of the mechanical movement constituting the drive means of the trimmer for actuating the reciprocating blades. Fig. 6 is an enlarged section taken on the line 6—6 of Fig. 1; and Fig. 7 is an enlarged section taken on the line 7—7 of Fig. 1.

As shown, the improved grass trimmer comprises a bottom or stationary plate 10 provided with forwardly projecting and spaced blades 11 having opposite cutting edges and tapered to a point. The forward ends of the blades 11 are curved upwardly as shown at 12 to prevent them from entering the ground and they are also beveled on their upper faces as shown at 13 to pass under grass which has been trodden down or fallen over, so as to insure the raising and cutting thereof. The plate 10 is provided with longitudinal bottom ribs 14 contiguous with the blades 11 and extending well back on the plate which is in turn provided with extensions 15 at its rear edge adjacent to the ends thereof. These extensions are beveled upwardly as shown at 16 by offsetting the plate to provide attaching portions for a stationary handle 17 positioned in alinement with the adjacent edge of the plate or trimmer and secured in position as by means of bolts 18, while a handle 19 is pivoted to the other extension as shown at 20 and adapted to swing in an arc toward and away from the stationary handle as indicated by the arrows in Fig. 1 of the drawings. By offsetting or cutting away the rear portions of the extensions 15 as shown at 16 the trimmer is allowed to pass through the grass without meeting with resistance at the rear and also to permit the dipping thereof at the rear to direct the blades upwardly at a slight angle to prevent the blades from projecting into the earth or to permit the trimmer to pass over a projection or travel up an inclined surface. Pivotal movement of the trimmer for this purpose is facilitated by providing a pair of small traction rollers 21 on the bottom of the plate 10 midway between the extremities of the blades and the rear edge of the plate or substantially so and journaling the same in bearings 22 fixed to or forming a part of the plate, as is more clearly shown in Figs. 3 and 4 of the drawings.

As is more clearly shown in Fig. 2 of the drawings, the plate 10 is relatively thin at its central portion as compared with its front and rear portions, the plate being provided with a vertical flange 23 at its forward edge and inner extremities of the blades which, together with the flange or rail 24 at the rear, produces a guideway for an upper or movable plate 25 which is slidably mounted between the shoulders thus produced and provided with a groove 26 to receive the flange 23 so as to accurately guide the movable plate as it reciprocates on the stationary plate in a manner to be hereinafter more fully set forth. The movable plate is provided with forwardly projecting blades 27 one less in number than the number of blades carried by the lower plate or formed therewith, and adapted to coöperate by means of their opposite cutting edges with the adjacent cutting edges of two of the bottom blades; that is, each upper blade operates between a pair of lower blades to effect a double action cutter. The upper plate is also recessed as shown at 28 between the blades 27 so as to permit the escape of grass which is cut and thereby prevent obstruction between the blades. As shown, there are nine upper blades and ten bottom blades so that the end blades of the movable plate will not slide farther than the extreme edges of the blades or knives of the bottom plate, and in this manner the striking of the end blades of the movable plate, as for instance, when running the machine parallel to a fence or likewise, is prevented.

In order to hold the blades positively in contact and thereby insure cutting of the grass, the bottom plate is provided with upward projections 29 near each end and adjacent to the forward edge thereof, the projections being apertured vertically to receive screws 30 which extend through transverse slots 31 in the upper or movable plate which is in turn provided with spaced transverse guides 32 in front and in rear of the slots 31. These guides are disposed in parallel relation and in alinement transversely with respect to the transverse dimension of the plate or trimmer to slidably engage the front and rear edges of flat arch-shaped springs 33 so that the curved extremities thereof will contact with plates 33' mounted on the screws between the guides 32 to permit the movable plate to slide there-beneath. The springs 33 are engaged on the screws and held in position by nuts 34 which are also engaged on the screws and which provide means for adjusting the tension of the springs to regulate the binding contact of the blades with each other or to permit them to run freely as possible consistent with the proper cutting action. The guides 32 thus hold the springs 33 against rotation and during the reciprocation of the upper plate and blades thereof on the lower plate and blades, the slots 31 will move over the screws 30 and the tensioning means thus described will prevent displacement of the movable plate with respect to the stationary plate.

To further assist in causing the binding engagement of the blades to insure positive cutting action, the bottom plate is provided with an upwardly opening transversely elongated seat or recess 35 in front of the flange or rail 24, said recess terminating short of the longitudinal edges of the bottom plate, as shown in dotted lines in Fig. 1 of the drawings, so as to movably receive an elongated plunger 36 therein. This plunger contacts with the upper plate, being so held by expansive springs 37 seated between the bottom of said plunger and the bottom wall of the recess in the stationary plate, so as to exert upward pressure against the rear portion of the upper plate to rock the same on the flange or guide 23 to cause the forward edges of the blades to be brought together for positive cutting action.

The means for causing the reciprocation of the movable plate and blades therewith comprises a segmental gear or rack 38 fixed to the pivoted handle or lever 19, the throw of which is considerable owing to the large amount of space allowed between the handles and the fact that the movable handle can swing freely to the right. These handles also serve as means for supporting, advancing and guiding the trimmer and are offset upwardly at their rear ends and provided with grasping portions 39 so that the hands will clear the ground when trimming grass, or the hedge when the hedge is being trimmed. Anchored to the bolts 18 and 20 is a cover plate 40 which is provided with a downwardly bent forward edge 41 contacting with the movable plate to further hold the latter in position. The movable plate is spaced apart from the stationary plate and the cover plate 40 is spaced from the movable plate, the purpose of this being to accommodate the driving parts which include a shaft 42 vertically journaled in the plates 10 and 40, while the plate 25 is provided with a transverse slot 43 to permit it to reciprocate independent of the shaft. The shaft 42 carries a pinion 44 which, like the segmental gear 38, is disposed between the plates 25 and 40, while the shaft 42 in turn rotatably carries a larger pinion or spur gear 45 which is positioned between the plates 10 and 25 and carries ratchet mechanism coöperating with the shaft whereby rotation may be imparted to the spur gear in one direction only. For this purpose the shaft 42 carries a ratchet wheel 46 and the spur gear is provided with a recessed upper face having a concentric flange 47 accommodating pivoted ratchets or dogs 48 normally held in engagement with the ratchet wheel as by means of springs 49 so that when the handle or lever 19 is swung to the right, as indicated by the arrow in Fig. 1 of the drawings, the segmental gear 38 will be swung in anti-clockwise direction to rotate the shaft 42 by means of the intermeshing pinion 44 to cause the ratchet wheel to rotate therewith but to freely pass by the ratchets or dogs 48 against the action of the springs 49, thereby permitting the spur gear 45 to remain stationary. Opposite swinging of the handle or lever to the left or downwardly, as shown by the arrow in Fig. 1 of the drawings, will result in the movement of the segmental gear in a clockwise direction to rotate the shaft 42 through the intermeshed pinion 44 and thus impart rotation to the spur gear due to the ratchets or dogs acting against the straight edges of the ratchet teeth as distinguished from the beveled edges thereof. Also vertically journaled in the plates 10 and 40 is a shaft 50 having a pinion 51 fixed thereto and disposed in mesh with the spur gear 45 and also having a cam or eccentric disk 52 fixed thereto on a plane coincident with the movable or reciprocating plate. This plate is provided with a longitudinal slot 53 with curved ends such as produced by two intersecting circles of equal diameter so that by rotating the shaft 50 and thus the eccentric disk 52 with the latter operating in the longitudinal slot 53, the movable plate and blades will be reciprocated in opposite directions when the point of the eccentric at its greatest eccentricity engages the opposite sides of the slot, while when said part of the eccentric is disposed forwardly or rearwardly in the curved portions of the slot, the movable or reciprocating plate will be disposed in an intermediate position and the blades 27 will be positioned intermediately the blades 11. The double reciprocation of the movable blades will therefore cause their opposite edges to coact with adjacent edges of each pair of stationary blades positioned there-beneath and in this manner a very efficient cutting action is provided.

Means are provided at the rear of the machine similar to the adjustment means at the front for varying the coaction of the blades, such means being provided to vary the tension action of the springs 37. For this purpose a bolt 54 is carried by or made fast to the bottom plate to extend through the same and through the plunger or bar 36, the bolt then passing through an elongated slot 55 in the top plate and accommodated behind the cover plate by recessing the same as shown at 56. A pair of guides 57 are provided on the top plate parallel to the slot 55 and on opposite sides thereof to receive a plate 58 therebetween. This plate is apertured to receive the bolt which extends above the same to receive a flat arch-shaped spring 59, the tension of which is capable of adjustment by means of a nut 60 threaded on the bolt. From the foregoing it is thought that the structure and operation of the device is clear and that further description is unnecessary.

Having thus described my invention, what I claim as new and desire to secure by Letters Patent is:—

1. A grass trimmer comprising a stationary bottom plate having blades projecting forwardly therefrom, said blades being beveled on the top and bottom faces of their forward extremities and tapered, ribs coincident with said blades and projecting downwardly and rearwardly from the latter and downwardly from the plate thereof, a second plate movably mounted on the first mentioned plate and having forwardly projecting blades tapered at their forward edges to correspond with the bevel of the forward edges of the first-mentioned blades at their top portions, an upwardly offset handle fixed to the stationary plate in alinement with one edge thereof and an upwardly offset movable handle also carried by said plate and operatively connected to the movable plate to shift the latter with respect to the stationary plate to cause co-action of the blades set forth.

2. A grass trimmer comprising a stationary bottom plate having blades projecting forwardly therefrom, said blades being beveled on the top and bottom faces of their forward extremities and tapered, ribs coincident with said blades and projecting downwardly from the latter and the plate thereof, a second plate movably mounted on the first mentioned plate and having forwardly projecting blades tapered at their forward edges to correspond with the bevel of the forward edge of the first-mentioned blades at their top portions, means to reciprocate the movable plate and blades whereby the opposite edges of the latter will coöperate with adjacent edges of the stationary blades, said means including a handle fixed to the stationary plate and a handle pivoted thereto and having drive connections with the movable plate, said ribs forming bottom engaging portions and a pair of bearing rollers journaled beneath the bottom plate midway of the length thereof, said stationary plate being directed upwardly at its rear end and the rollers being adapted to rotatably support the trimmer in close proximity to the ground when trimming grass and permitting the blades to be inclined upwardly or downwardly to regulate the height at which the cutting action takes effect.

3. A grass trimmer comprising a stationary plate and a movable plate mounted thereon, said plates having coöperating blades and the bottom plate having a transverse guideway on which the movable plate is slidably mounted, a handle fixed to the stationary plate and projecting rearwardly therefrom adjacent one edge, said plates being disposed in spaced relation, a cover plate connected to the stationary plate and positioned in spaced relation to the movable plate, means for resiliently holding the plates together with their blades in contact, a pair of shafts vertically journaled in the stationary and cover plates, said movable plate being provided with a longitudinal slot, an eccentric disk fixed to one shaft and operating in said slot, drive connections between the shafts and a handle pivoted to the stationary plate and operatively connected to the other shaft for rotating the shafts and reciprocating the movable plate.

4. A grass trimmer comprising a stationary plate and a movable plate mounted thereon, said plates having coöperating blades and the bottom plate having a transverse guideway on which the movable plate is slidably mounted, a handle fixed to the stationary plate and projecting rearwardly therefrom adjacent one edge, said plates being disposed in spaced relation, a cover plate connected to the stationary plate and positioned in spaced relation to the movable plate, means for resiliently holding the plates together with their blades in contact, a pair of shafts vertically journaled in the stationary and cover plates, said movable plate being provided with a longitudinal slot, an eccentric disk fixed to one shaft and operating in said slot, drive connections between the shafts and a handle pivoted to the stationary plate and operatively connected to the other shaft for rotating the shafts to impart opposite rotation to the movable plate and blades when the handle is swung in one direction and adapted to permit opposite movement of the handle while said drive means and movable plate remain stationary.

5. A grass trimmer comprising a stationary plate and a movable plate mounted thereon, said plates having coöperating blades and the bottom plate having a transverse guideway on which the movable plate is slidably mounted, a handle fixed to the stationary plate and projecting rearwardly therefrom adjacent one edge, said plates being disposed in spaced relation, a cover plate connected to the stationary plate and positioned in spaced relation to the movable plate, adjustable means for resiliently holding the plates together with their blades in contact, a pair of shafts vertically journaled in the stationary and cover plates, said movable plate being provided with a longitudinal slot, a cam fixed to one of said shafts and operating in said slot, a pinion also fixed to said shaft and positioned between the stationary and movable plates, a spur gear loose on the other shaft and disposed in mesh with the pinion, ratchet means between the spur gear and the second mentioned shaft whereby rotation may be imparted to the spur gear in one direction only, a pair of handles mounted on the stationary plate, one of said handles being pivoted and geared to the second-mentioned shaft to rotate the latter in opposite directions when the handle is swung in opposite directions in an arc on opposite sides of its pivot, movement of the handle in one direction imparting a double reciprocating motion to the movable plate and blades by rotation on the cam in the slot.

In testimony whereof I have signed my name to this specification in the presence of two subscribing witnesses.

CORNELIUS CASSIDY LIPPEN.

Witnesses:
EDWARD F. PATTERSON,
CHAS. BENTLEY COLLINS.